United States Patent
McCracken et al.

(10) Patent No.: US 7,437,322 B1
(45) Date of Patent: Oct. 14, 2008

(54) MANAGING INVESTMENT ASSETS

(75) Inventors: Kurt C. McCracken, Philadelphia, PA (US); Eric Ziegler, Corte Madera, CA (US)

(73) Assignee: Prana Fund Manager, LLC, San Francisco, CA (US)

( * ) Notice: Subject to any disclaimer, the term of this patent is extended or adjusted under 35 U.S.C. 154(b) by 793 days.

(21) Appl. No.: 09/610,828

(22) Filed: Jul. 6, 2000

(51) Int. Cl.
G06Q 40/00 (2006.01)
(52) U.S. Cl. .................................. 705/36 R; 705/36 T
(58) Field of Classification Search ............. 705/35–45, 705/36 R, 36 T
See application file for complete search history.

(56) References Cited

U.S. PATENT DOCUMENTS

| | | | | |
|---|---|---|---|---|
| 5,126,936 | A | * | 6/1992 | Champion et al. ............ 705/36 |
| 5,689,650 | A | * | 11/1997 | McClelland et al. .......... 705/36 |
| 5,950,175 | A | * | 9/1999 | Austin .......................... 705/35 |
| 6,292,788 | B1 | * | 9/2001 | Roberts et al. ................ 705/36 |
| 6,941,280 | B1 | * | 9/2005 | Gastineau et al. ........... 235/379 |
| 2002/0143673 | A1 | * | 10/2002 | Hitchings et al. ............. 705/30 |

OTHER PUBLICATIONS

"A REIT's Right Moves/Investment fad fuels growth of real estate firm" (Louis,Arthur. Jul. 8, 1997. San Francisco Chronicle).*
"The REIT stuff" (Goodkin, Lewis. Dec. 1, 1999. Florida Trend).*
"Real estate trusts advance as investors of large buildings" (Holusha, John. Feb. 13, 1998. Journal Record).*
"Commercial Real Estate/Flood of Cash Boosts REIT Liquidity" (Wax, Alan. Apr. 21, 1997. Newsday).*
"Real Estate Managers Sing Praises of New Financial Hybrid" (Galperin, Ron. Jun. 27, 1995. The Los Angeles Times).*
"An Overview of Limited Liability Companies" (Ward, J Marc. Mar. 1993. The Practical Real Estate Lawyer).*
"Whatever you do, there's a software for you" (Sinderman, Martin. Jan. 1998. National Real Estate Investor).*
"New Form of Business Offers Advantages" (McDonough, Edward. Oct. 17, 1993. The Salt Lake Tribune).*
"Limited Liability Companies" (Shangraw, Michael. Jan. 1991. The Tax Adviser).*
"Choosing a Business Entity in the 1990s: From Sole Proprietorships to Limited Liability Companies, which is best for you?" (Blair, Larry S. Aug. 1995. Pennsylvania CPA Journal).*
"A New Breed of Company" (Calderon, Jeanne. Jan./Feb. 1996. Financial Executive).*
"A liability shield for entrepeneurs" (Hotch, Ripley. Aug. 1994. Nation's Business).*
"Tools for boosting portfolio performance" (Feshbach, Dan et al. Oct. 1999. Mortgage Banking).*

(Continued)

*Primary Examiner*—Nicholas D Rosen
(74) *Attorney, Agent, or Firm*—Fish & Richardson P.C.

(57) ABSTRACT

A method for providing investor liquidity and portfolio growth includes (a) acquiring properties from investors through tax-preferred transactions, at least one of the properties being acquired from one of the investors in exchange for an interest in an investment entity; (b) disposing of at least one of the properties that falls outside of an investment profile; (c) enhancing the value of at least one of the properties by physical improvements; and (c) redeeming interests of investors by the investment entity.

10 Claims, 3 Drawing Sheets

OTHER PUBLICATIONS

"Automating the Portfolio Manager" (Skelton, Jeffrey. Dec. 1987. Institutional Investor).*

DeYoung, D., "REITs Change Landscape," Minneapolis-St. Paul CityBusiness, vol. 15, No. 23, p. 1, Nov. 7, 1997.*

Anon., "W.P. Carey Group Year-To-Date Acquisitions Exceed $300 Million; Acquisition Strategy Bolsters Strength and Diversit of Real Estate Portfolios," PR Newswire, Jul. 31, 1998.*

Nichols, P., "Fidelity Lauds Stratus' Faithful Computing" (Abstract only), Wall Street Computer Review, vol. 5, No. 2, pp. 52-58 Nov. 1987.*

Radding, A., "Mutual Fund Accounting Software Tackles the Globe," Wall Street Computer Review, vol. 8, No. 3, p. 55, Dec. 1990.*

Anon., "Putnam Cos.: Putnam'sNew Average Cost Basis Statement to Make Shareholder Job Easier at Tax Time," Business Wire, Apr. 2, 1991.*

Schwartzman, S, "Fidelity's Formula: Technology Keeps Customers Happy," Wall Street Computer Review, vol. 8, No. 10, p. 27, Jul. 1991.*

Anon., "Your Money Total Return Is Better Gauge of Mutual fund Performance," Atlanta Constitution, Business section, p. F/2, Feb. 5, 1993.*

Burger, K., "On-line Offshore," Wall Street & Technology, vol. 10, No. 11, pp. 16-24, Jun. 1993.*

Anon., "Technology Review," Pension World, vol. 29, No. 9, p. 37, Sep. 1993.*

Moreau, D., "Quick Study: Total Return," Kiplinger's Personal Finance Magazine, vol. 49, No. 1, p. 111.*

Sutter, T., "Distribution of Mutual Fund 1099s Improved; More Cahnges Considered," Trust & Investments, vol. 69, pp. 40-41, May/Jun. 1999.*

Novack, J., "The Taming of the Code," Forbes, p. 280, Jun. 12, 2000.*

Anon., "Halifax Account Wrangle," Financial Times, p. IV, Dec. 7, 1991.*

Basara, T.S., et al., "Taking Care of No. 1: Financial Planning," Drug Topics, vol. 139, No. 9, p. 68, May 8, 1995.*

Anon., "ASA Knocks Instant Access," Bank Marketing International, No. 90, p. 5, Mar. 1998.*

Wolverton et al., "Real Estate Portfolio Risk Reduction Through Intracity Diversification," Journal of Real Estate Portfolio Management, vol. 4, No. 1, pp. 35-41, 1998.*

Ray A. Smith; Staff Reporter of The Wall Street Journal; *Some Real-Estate Firms Launch Tenancy-in-Common Programs*; From the Archives: Sep. 11, 2002, pp. 1-3.

Ray A. Smith, Staff Reporter of The Wall Street Journal, *Private Commercial REITs Have Gotten into the Game*, From the Archives, Feb. 19, 2003, pp. 1-4.

Ray A. Smith, "Investors Broaden Reach With 1031-721 Exchange", *The Wall Street Journal*, (May 5, 2004).

* cited by examiner

MANAGING INVESTMENT ASSETS

BACKGROUND

This invention relates to managing investment assets.

Individual investors holding assets such as income producing real estate must manage the assets efficiently or risk losing value relative to well-managed assets. Well-managed properties may offer limited opportunity for high levels of appreciation. Real estate asset values can be enhanced by physical improvements, refurbishment and efficient management, making them more attractive to rent payers. However, a well-managed and already refurbished property may offer less opportunity for value enhancement, limiting the asset value growth potential to the general overall rise in real estate values.

Older and retired investors often have cash needs that are different from those of younger investors and are more likely to need a way to convert portions of their holdings into cash. Partial liquidation of holdings is frequently not a viable option. Such investors face significant tax liabilities upon the gain realized from the sale of their properties. Continuing to hold properties that have been refurbished and which are well managed and renting at market rates limits their opportunity for greater investment growth.

Diversification of investments can reduce the risk to which an individual investor is subject. That diversification may be accomplished by pooling the investments of several investors.

Tax on the gain (excess of the selling price over the tax basis) that is otherwise payable upon the disposal of the asset can be postponed by tax-deferred exchanges such as provided under section 1031 of the Internal Revenue Code.

Finding appropriate properties for which an individual investor's asset may be exchanged can be difficult. An investor may find the available selection of properties in a local market to be limited. An investor may not have the resources to locate and effectively investigate properties in distant markets. Moreover, a tax-deferred exchange, while providing an opportunity for enhanced asset growth through refurbishment and improved property management, may not meet an investor's current cash requirements.

SUMMARY

In general, in one aspect, the invention features a method for providing investor liquidity and portfolio growth. The method includes (a) acquiring properties from investors through tax-preferred transactions, at least one of the properties being acquired from one of the investors in exchange for an interest in an investment entity; (b) disposing of at least one of the properties that falls outside of an investment profile; (c) enhancing the value of at least one of the properties by physical improvements; and (d) redeeming interests of investors by the investment entity.

Implementations of the invention may include one or more of the following features. The investment profile may include income producing real estate such as inner-city residential rental properties, distressed properties, properties for which a purchase price for an individual property divided by a total rent obtained from such property is low relative to other properties located in a surrounding area, or residential rental properties for which rents are below market for a neighborhood proximate to such properties.

The investor may make a tax-free contribution of the property in exchange for an interest in the investment entity. The redemption of interests of investors may be limited at any one time to a predetermined portion of a value of the properties held by the investment entity.

In general, in another aspect, the invention features a system of managing investment assets. The system includes (a) an investment entity for receiving tax-preferred contributions of at least one property from at least one investor in exchange for an interest in the investment entity, and for managing, holding and exchanging properties through tax-preferred transactions; (b) an investment profile comprising a disciplined portfolio approach that uses diversification and contingent risk minimization; (c) a computer system to record and analyze investments held by the investment entity and to analyze other properties within the investment profile for possible investment by means of tax-preferred transactions and to determine which properties held by the investment entity may fall outside the investment profile and which are suitable for disposal; (d) a management entity to actively enhance the value of properties held by the investment entity by means of physical improvements, refurbishment and management efficiencies; and (e) a plan of redemption of interests of investors.

In implementations of the invention, the management entity may be the same as the investment entity, and the investment entity may also receive cash investments.

Among the advantages of the invention are one or more of the following: (i) pooling investments to provide asset diversification; (ii) relieving individual investors of the day to day responsibility for asset management and providing economies of scale to such management; (iii) deferring tax liability for investors who contribute assets other than cash that have a built-in gain; (iv) providing liquidity for investors, allowing them to time the taxation on their investment and spread the gain over time and possibly lower rate brackets; (v) deferring taxes on increases in asset value when assets are disposed of which no longer meet a desired investment profile; (vi) broadening the selection of available assets suitable for tax deferred exchange; and (vii) improving the asset value growth potential of the portfolio of pooled investment assets by active management of the assets.

Other advantages and features will become apparent from the following description and from the claims.

DETAILED DESCRIPTION

Figure 1:
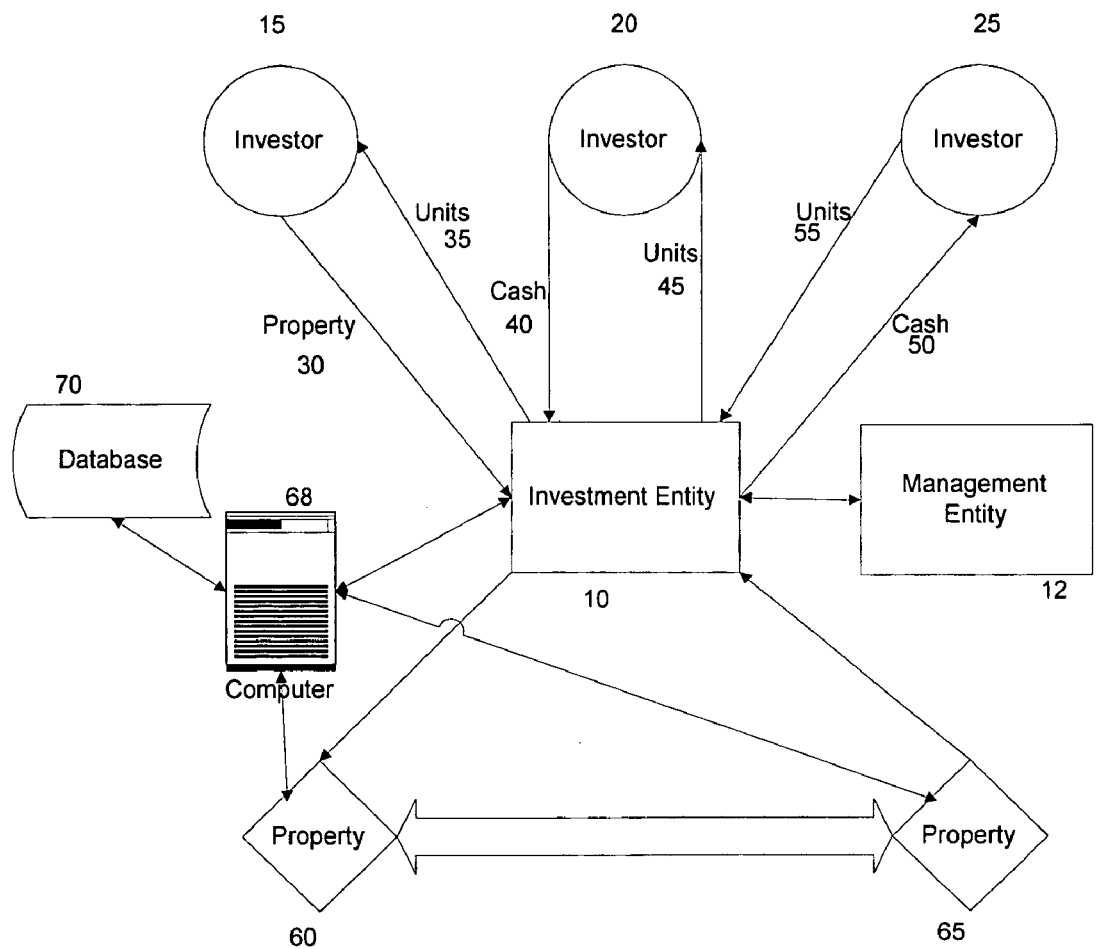
FIG. 1 is a block diagram of an investment management structure.

FIG. 1 shows a block diagram of an investment management structure. An investment entity 10 acquires, holds, and disposes of investment properties. It uses a management entity 12 to do the actual management of the properties, which entity may be one or several separate entities, and may include the investment entity itself. The investment entity may be a limited partnership, a limited liability company or other entity which under applicable tax law is eligible for and meets the tax deferral objectives. The management entity may be any convenient entity. An entity such as a limited partnership which provides for no or limited taxation at the entity level (a pass-through entity) is desirable.

The term "tax preferred" means tax deferral (such as by means of a like kind exchange which results in no recognition of gain at the time of exchange) and includes any other techniques for tax deferral and minimization.

Investors 15, 20 and 25 may acquire units 35, 45 and 55 of the investment entity by outright purchase for cash 40 or by contribution of property 30 for units. It is desirable that these property contributions be tax-free or tax-deferred. Investors may liquidate all or limited portions of the units they hold by redemption of such units 55 for cash 50 as described below.

A property 60 that does not meet a defined investment profile may be exchanged by the investment entity 10 for a property 65 which does meet the investment profile. A property may fail to meet the investment profile because it is of a type that the investment entity and its management believe is not suitable for chosen investment objectives, because it cannot be managed economically or is outside the expertise of management personnel, or because it does not offer the potential for above-market rates of return at a reasonable level of risk (e.g., because it has negative cash flow and little room for growth in revenue).

A computer 68 and database 70 storage system are used to keep track of, calculate and report as needed each investor's book and tax basis for units, including allocations of income and expenses. The management entity 12 uses a computer and database 70 to identify properties 60 that are eligible under tax law and appropriate economically for disposition, for managing properties during the holding period and monitoring appreciation, and to evaluate offers when selling properties. In addition, the computer and database are used in the detailed tax record-keeping required for each investor and for analyzing the tax effects of potential tax-deferred exchange transactions.

Figure 2:
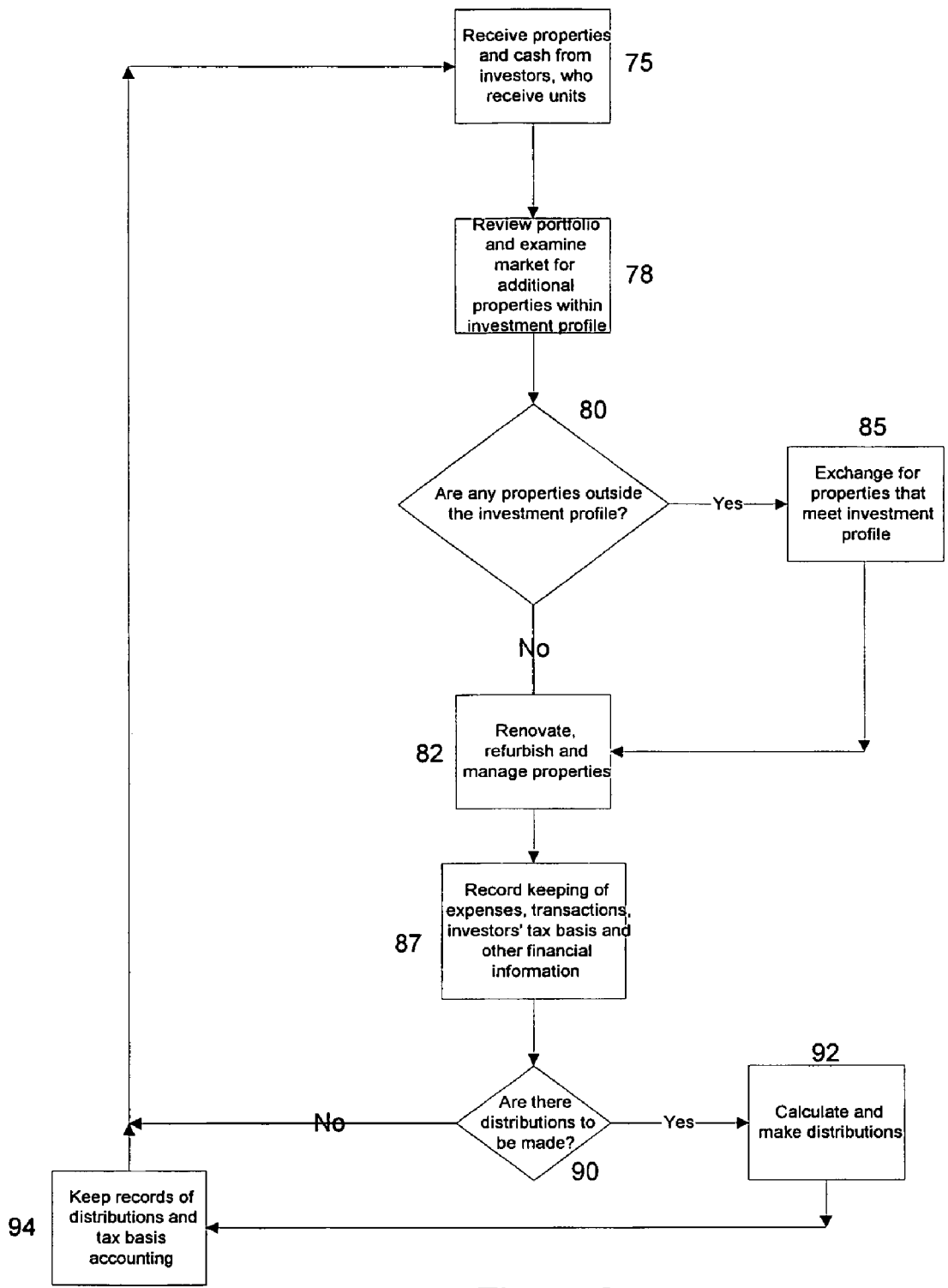
FIGS. 2 and 3 are flow charts.

FIG. 2 shows a flowchart of the investment management process. The investment entity 10 receives 75 properties and cash, and the investors receive units in the investment entity. The investment entity reviews 78 its portfolio of properties and determines 80 whether any properties are not within the investment entity's 10 investment profile. The investment entity 10 disposes 85 of those properties outside of the investment profile, by favorable tax-deferred exchanges as appropriate. The computer 68 and database 70 are used to evaluate properties against a database of previously purchased and rejected property profiles, analyze their potential for achieving target internal rates of return and the sensitivity of the return to changes in variables, and plan for appropriate diversification (e.g., as to geographic location, size, types of units, types of tenants). After a property is acquired, the computer and database are used to manage the records relating to the properties and to provide systematic reporting regarding each property so as to aid in its efficient management. The computer and property database are subsequently used to identify properties in the portfolio that should be disposed of because they have achieved the increase in value that produces an internal rate of return within the target range.

The investment entity 10 through the management entity 12 actively manages 82 the properties it holds by, for example, refurbishment, renovation, physical improvements and improved management of the rental and leasing process. The investment entity 10 utilizes 87 the computer 68 and database 70 to keep track of transactions and record and allocate expenses so as to be able to report the necessary financial and tax information to investors.

Figure 3:
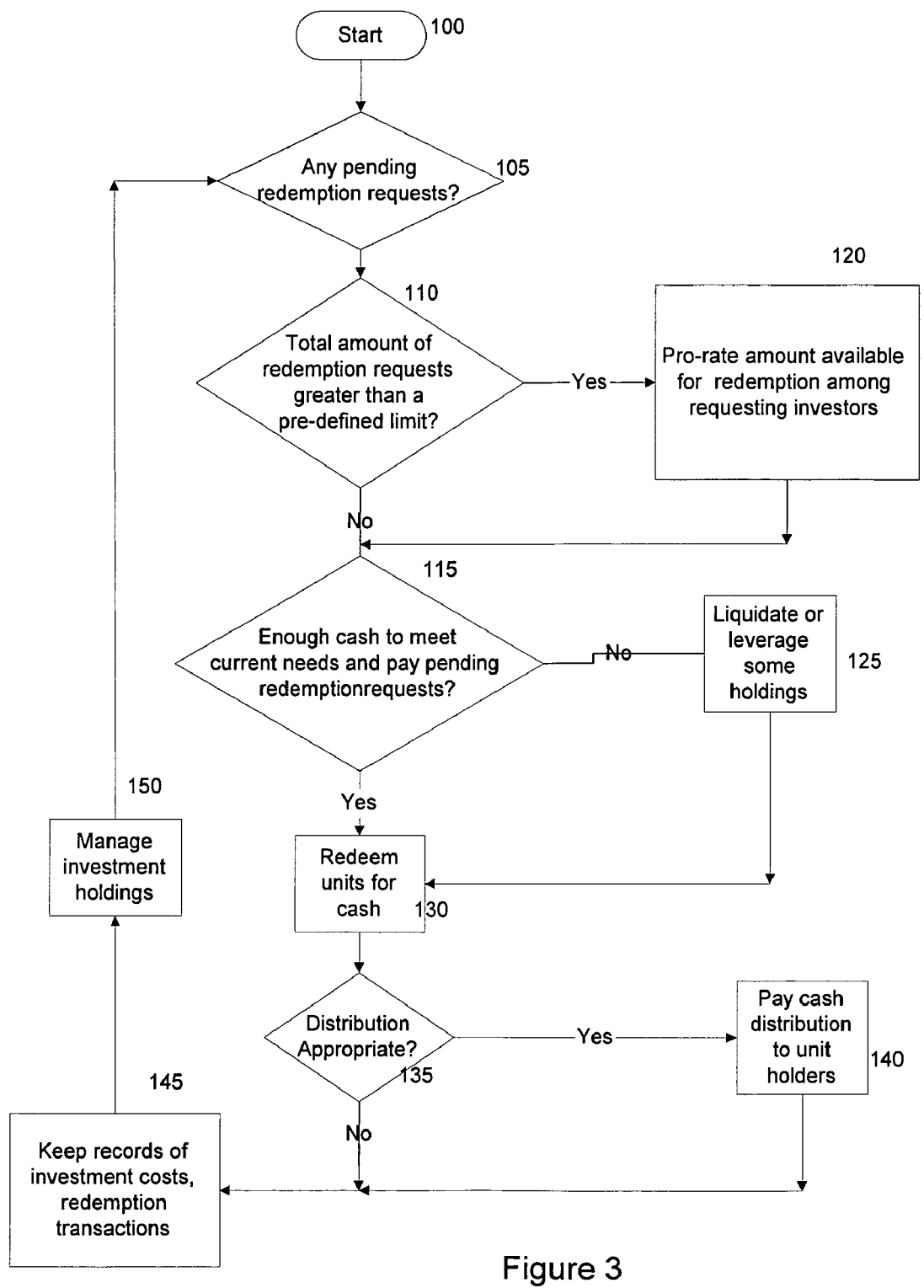

FIG. 3 shows a flow chart which diagrams how limited investor liquidity is provided. Beginning at 100, the investment entity 10 determines 105 whether any investors have requested redemption of some or all of their units. If not, then the investment entity 10 determines 135 if it is appropriate to make a distribution, such as resulting from cash surplus to requirements. If redemptions are pending, then the investment entity 10 determines 110 if the total value of such redemptions exceeds a predetermined limit on redemptions. Such a limit may be imposed so as to prevent excess redemptions at a single period of time that might otherwise jeopardize the investments of other investors. If there are excess redemptions requested above the limit, then the amount available to meet the redemption requests is pro-rated 120 among the requesting investors. The investment entity 10 determines 120 if it holds sufficient cash to satisfy the pending redemption requests, and if not, it liquidates or leverages its 125 holdings to meet the cash requirements. Pending redemption requests (pro-rated as determined at 120 if necessary) are then paid to requesting investors.

If the investment entity 10 determines 135 that a distribution is appropriate (for example, because a property was sold without being replaced in a like-kind exchange), it may decide to make a distribution 140 to holders of units in the investment entity 10.

A record is kept 145 in a computer 68 and database 70 of the details of the transactions, valuations of properties, expenses and other transactions of the investment entity, each investor's ownership position and its value, and each investor's share of the tax basis items for each property (so as to be able to report accurately to an investor, upon request, information necessary for annual tax reporting or for determining gain if his units are redeemed). The computer 68 and database 70 are also used 150 to track possible investments, model investment strategies, and compare possible properties against such models.

In a specific example, the investment entity is a limited partnership. The investment profile consists of moderately priced residential income producing properties located in transitional, inner-city locations, ranging from small buildings containing one to four units to larger buildings containing up to 200 units.

Inefficient markets provide the opportunity to earn higher returns than other investments of similar risk. Real estate is a relatively inefficient market because (i) each property is unique; (ii) there are few transactions; (iii) there are many unsophisticated buyers and sellers; (iv) transaction costs are high; and (v) financing can be difficult to obtain. The investment entity can enhance the value of its holdings (and thereby the value of units in the investment entity held by investors) by applying a disciplined portfolio approach to selecting properties of varying sizes, in different markets, and with a variety of physical and financial characteristics (e.g., location, state of repair, tenant mix, existing financing, and availability of new financing).

The market of poorly managed residential buildings in transitional residential neighborhoods in inner-city areas provides an opportunity for higher returns from inefficient markets. Factors contributing to the inefficiencies of such a market include (i) significant government regulation; (ii) large variances in rents for similar units; (iii) large differences in the physical condition of buildings; and (iv) no room for lateral growth. In this example, the investment entity will look for markets in which the demand for housing is high and the supplies limited.

Neighborhoods are evaluated on a block-by-block basis. The proximity of public transportation, parks, retail services, educational facilities and police presence have a significant impact on an area's desirability. These factors also play an important role in stabilizing or destabilizing a neighborhood. A computer system 68 and database 70 are used to store, arrange and evaluate information concerning potential investment areas.

Such properties offer the opportunity of asset value enhancement over and above market rates of appreciation. An important manageable aspect of enhanced asset appreciation in real estate is increasing rents. Consequently, in the example described, there will be a particular focus on improving the properties to achieve higher rents.

In an aspect of the invention, a computer is used to assist in evaluating income producing residential properties. The computer uses a spreadsheet to compare the rent rolls of a proposed target property with other similar properties in the area, and also against a presumed market rent roll for the property in question, assuming all of the units of the property could be rented anew at market rates. Properties are sought which are renting at fifty to sixty percent of market rates. Properties are further evaluated by examining the vacancy rate, management of the property, physical condition, dangerous conditions, whether some tenants are undesirable (e.g. dealers in illegal drugs), whether there may be building code violations, problem tenants (e.g. tenants behind in their rent), whether there are problems with physical security such as missing locks and whether the property may be unclean.

Estimates are made regarding the cost to address each of these conditions, including refurbishment and repair, and the time and cost to eliminate undesirable and problem tenants and replace them with rent-paying tenants at market rates. Markets are chosen in which the management entity is familiar with local rental laws.

In selecting properties and disposing of properties, a disciplined portfolio approach to the mix of properties may also form a part of managing the investment entity. Capital can be allocated to minimize contingent risk by devoting no more than a pre-defined percentage of the capital to acquiring equity in properties, reserving a specified percentage for negative cash flows and property improvements during the period after initial acquisition while problems are being addressed, and reserving the balance for contingencies such as unexpected repairs or improvements. Care must be taken to assure that there is a good mix of properties (e.g. number of units, rent-controlled and non-rent-controlled units, income producing properties vs. properties in the initial stages of refurbishment which may produce negative cash flows).

Other investment profiles and asset types may be utilized.

Having selected an investment profile and identified a market, individual assets may be targeted. In the example described, once neighborhoods are identified, individual buildings are selected based primarily on the opportunity for increasing rents. Particular focus can be given to the following factors: (i) properties with rents which are below market for the neighborhood; (ii) distressed properties or properties offered at foreclosure sales where such properties may be obtained at a purchase price that compares favorably with nearby properties; (iii) properties where the gross rent multiplier (purchase price divided by total rents) is low relative to other properties in the area.

Individual investors frequently lack the expertise or resources to manage their individual properties as efficiently as may otherwise be accomplished. The investment entity, holding a broader array of properties, is able to afford more expert management because of the economies of scale.

Maintenance of common areas may be improved, and where significant building code violations exist when a property is first obtained, these are corrected. When tenants move, individual units may be renovated. Because a single investment entity may hold numerous properties, the investment entity can afford to have managers with significant expertise in dealing with local rent regulations, which give a competitive advantage over property owners without such expertise in managing properties subject to rent controls. Similarly, by managing creation of vacancies and rehabilitation of vacant rental units, such units may be offered at higher rents. The attractiveness of such rehabilitation frequently results in existing tenants being willing to obtain rehabilitated apartments at higher rents.

Financing in such neighborhoods is sometimes unavailable due to the neighborhood's state of transition and the properties' condition. In such situations, the investment entity is able to obtain private mortgages. Although these loans carry interest rates that are higher than institutional loans and require short-term balloon payments, they permit the investment entity to obtain discounts in the purchase price of properties and maximize the beneficial effect of leverage on its investment returns.

Assets that are no longer susceptible of enhanced asset value growth, such as through improvements and efficient management, may be sold or exchanged for assets that meet the investment profile. Tax deferred exchanges are utilized wherever possible so as to maximize the after-tax return to investors.

In the example described, properties held by the limited partnership may be sold or exchanged when the rent rolls have been increased to near market and a price (or value, in the case of an exchange) may be obtained for the property at the high-end of the targeted sale multiple range for the location and the type of property. The form of the transaction will depend upon the needs of the limited partnership and the desirability for tax-deferral. In addition, as may frequently be the case, a property held by an investor may be acquired which does not fit the investment profile. In the present example, an investor may offer a Chicago office building or a Florida strip shopping center. While such a property may meet the applicable requirements for a tax-free contribution to the investment entity, permitting the investor to continue his investment by holding units in the investment entity 10 without incurring tax, the investment entity 10 may, after satisfying holding period requirements for tax purposes, dispose of the property through sale or tax-deferred exchange to obtain one or more properties that do meet the investment profile.

To meet the liquidity goals of investors and its own cash needs, the investment entity 10 will maintain some cash. In the example described, cash may be obtained from the sale of units in the investment entity, from cash flow produced by the assets held by the investment entity, from borrowed funds, and from sales of assets or boot obtained in an exchange transaction. Additionally, the limited partnership may engage in mortgage lending. The desirable amount of cash to be held by the investment entity 10 will fluctuate depending upon the cash needs of the entity to meet its investment goals, including acquisition of properties and maintenance and refurbishment, as well as the cash requirements of investors.

To balance the interests between current cash needs of investors and investors desiring to maximize their return by continued holding of their investments, the investment entity may put limitations on the amount of an investor's holdings which are eligible for liquidation by the investment entity at any particular time. Such limitations may take the form of allowing redemptions only at specified intervals, or limiting the total of such redemptions during any period to a limited percentage of an investor's holdings or a percentage of the total value of properties held by the investment entity, or a combination of one or more of these limitations. By offering the opportunity for an investor to liquidate portions of such investor's holdings in the investment entity through repurchase of such interests by the investment entity, an investor is afforded the opportunity to obtain some cash without becoming subject to tax on the investor's gain in the entire investment.

Because the investment entity permits investors to acquire units (through cash or real property contributions) at any time and provides for periodic liquidation rights, an investor who enters subsequent to an earlier investor will, if the value of the assets held by the investment entity have appreciated, obtain a portion of the unrealized value experienced by the earlier investor. Conversely, an investor who exercises a liquidation option realizes his pro-rata share of the appreciation and value of the units of all the investors who remain. For each investor, the disparity between the fair market value of an investment unit and its lower tax basis is subject to burdensome tax basis accounting rules requiring the use of a computer system. Such computer 65 and database 70 system keeps track of and calculates each investor's book and tax basis for units, including complex allocations of income and expenses required by the present tax code. Because the investment entity may accept contributions of properties that have built-in gain at the time of contribution and because tax-deferral techniques will be used in managing the portfolio, the system also must track the basis effects for each investor on a property-by-property basis.

Other implementations are within the scope of the following claims. For example, other investment profiles and other types of investments may be used. An investment profile might include other kinds of real estate, commercial establishments, antique cars, yachts or resort condominiums. Other provisions of the tax code that provide for preferential tax treatment may also be used.

What is claimed is:

1. A machine-based system of managing investment assets for use in connection with investments in real properties comprising:

an investment entity for receiving tax-advantaged contributions of at least one real property from at least one investor in exchange for an interest in the investment entity, and for managing, holding and exchanging real properties through tax-advantaged transactions, an investment profile comprising a disciplined portfolio approach that uses diversification and contingent risk minimization, a machine-based system to (a) track each investor's basis in his interest in the investment entity, (b) record and analyze real properties held by the investment entity, (c) allocate the basis and tax attributes of real properties held by the entity among the investors, (d) track the basis and tax attributes allocable to each investor in the real properties of the entity, (e) from time to time determine a current value of an interest in the investment entity based on characteristics of the one or more real properties held by the investment entity, and (f) analyze other real properties within the investment profile for possible investment by means of tax-advantaged transactions and to determine which real properties held by the investment entity fall outside the investment profile and transactions and which are suitable for disposal;

at least one management entity to actively enhance real properties held by the investment entity by means of physical improvements, refurbishment and management efficiencies; and a plan of redemption of interests of investors, the redemptions occurring at a value based on characteristics of one or more of the real properties.

2. The system of claim 1 in which the investment profile comprises income-producing real estate.

3. The system of claim 1 in which the investment profile comprises inner-city residential properties.

4. The system of claim 1 in which the investment profile comprises distressed real properties.

5. The system of claim 1 in which the investment profile comprises real properties for which a purchase price for an individual real property divided by a total rent obtained from such a property is low relative to other real properties located in a surrounding area.

6. The system of claim 1 in which the investment profile comprises residential rental properties for which rents are below market for a neighborhood proximate to such properties.

7. The system of claim 1 in which the tax-advantaged contribution comprises a tax-advantaged contribution of real property.

8. The system of claim 1 in which the plan of redemption further comprises a limitation to a predetermined portion of a value of the real properties held by the investment entity.

9. The system of claim 1 in which the at least one management entity is the same as the investment entity.

10. The system of claim 1 in which the investment entity also receives cash investments.

* * * * *

UNITED STATES PATENT AND TRADEMARK OFFICE
CERTIFICATE OF CORRECTION

| | | |
|---|---|---|
| PATENT NO. | : 7,437,322 B1 | Page 1 of 1 |
| APPLICATION NO. | : 09/610828 | |
| DATED | : October 14, 2008 | |
| INVENTOR(S) | : Kurt C. McCracken et al. | |

It is certified that error appears in the above-identified patent and that said Letters Patent is hereby corrected as shown below:

Title Page, Column One, Line 1 – delete "Philadelphia, PA" and insert -- New York, NY --.

Title Page, Column Two, Line 18 – delete "entrepeneurs" and insert -- entrepreneurs --.

Page 9, Column Seven, Line 40 – In Claim 1, delete "transactions," and insert -- transactions; --.

Signed and Sealed this

Thirteenth Day of January, 2009

JON W. DUDAS
*Director of the United States Patent and Trademark Office*